United States Patent
Eibes, deceased et al.

[15] 3,638,259
[45] Feb. 1, 1972

[54] METHOD FOR MAKING BLIND RIVETS

[72] Inventors: Carl B. H. Eibes, deceased, late of Schaittenbach, Germany; Ursula Eibes geb. Waschau; Christian Eibes, both of Schnaittenbach; Carl-Herwig Eibes, Berlin-Schoneberg; Maria-Theresia Wagner geb. Eibes, all heirs, Amberg, all of Germany

[73] Assignee: Kerb-Konus-Gesellschaft Dr. Carl Eibes & Co., Schnaittenbach am opf., Germany

[22] Filed: Jan. 29, 1968

[21] Appl. No.: 701,490

[30] Foreign Application Priority Data

Feb. 1, 1967 Germany..................E 33312

[52] U.S. Cl..........................10/27, 85/38, 85/84
[51] Int. Cl..........................B21k 1/58, B23g 9/00
[58] Field of Search............10/11, 27, 27 PH, 15, 18, 20.5, 10/24; 85/38, 84

[56] References Cited

UNITED STATES PATENTS

| 1,680,244 | 8/1928 | Carr | 10/18 |
|---|---|---|---|
| 2,065,333 | 12/1936 | Kirley | 85/84 |
| 2,640,618 | 6/1953 | Hale | 85/84 |
| 788,552 | 5/1905 | Neider | 10/27 |
| 2,843,861 | 7/1958 | Gandy | 10/27 |
| 2,843,928 | 7/1958 | Gandy | 10/27 |
| 2,887,694 | 5/1959 | Sauter | 10/27 |
| 3,009,177 | 11/1961 | Carusi et al. | 10/27 |
| 3,114,921 | 12/1963 | Carusi | 10/27 |
| 3,445,870 | 5/1969 | Kolec | 10/27 |

FOREIGN PATENTS OR APPLICATIONS

| 507,164 | 9/1930 | Germany | 10/18 |

*Primary Examiner*—Charles W. Lanham
*Assistant Examiner*—E. M. Combs
*Attorney*—Hall, Pollock and Vande Sande

[57] ABSTRACT

The disclosure relates to blind rivets and to an improved method of making such rivets. Symmetrically disposed slots are formed in the plain end of the rivet by means of chisel-type or edge-cutting tools so as to form several segments or lugs which, in use, may be spread apart by a spreading pin or the like to secure two or more members together.

4 Claims, 21 Drawing Figures

PATENTED FEB 1 1972 3,638,259
SHEET 1 OF 5
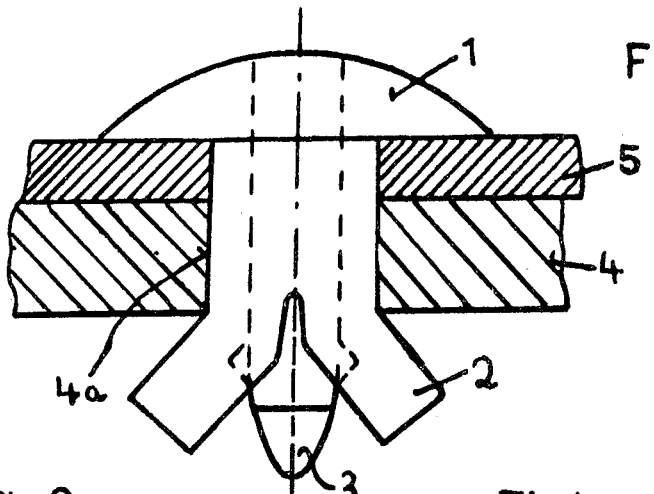
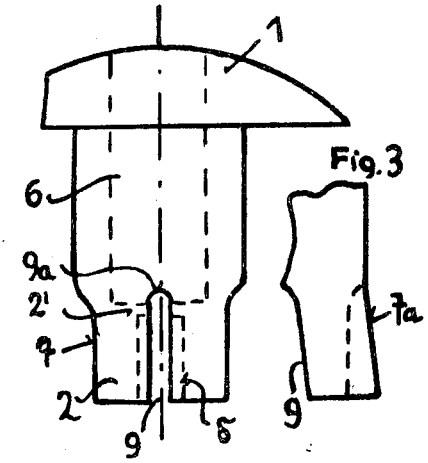
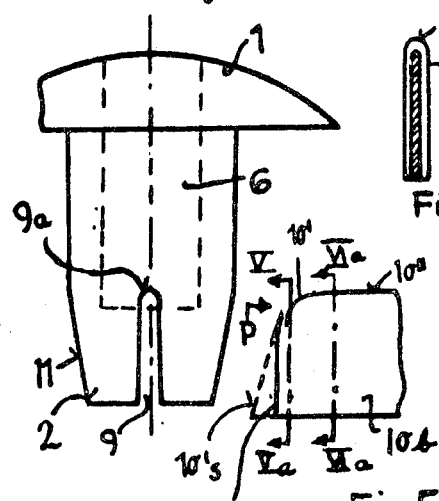
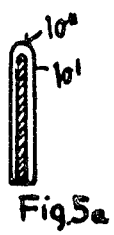
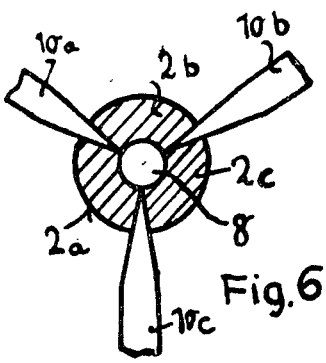
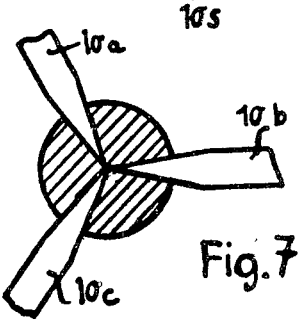
INVENTOR
CARL B.H. EIBES, Deceased
by U. EIBES, C. EIBES,
C.H. EIBES and
M.T. WAGNER, Heirs
BY Hall, Pollock + Vande Sande
THEIR ATTORNEYS

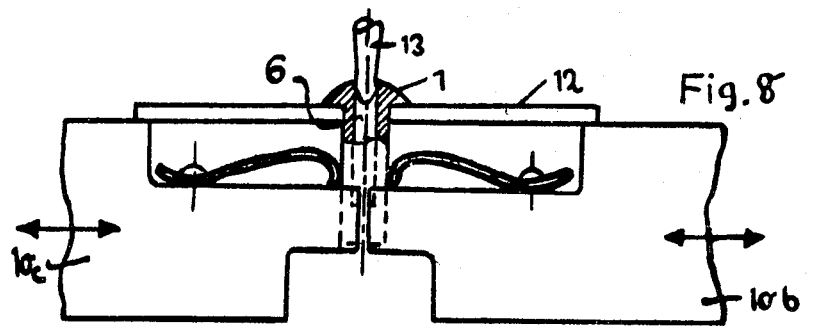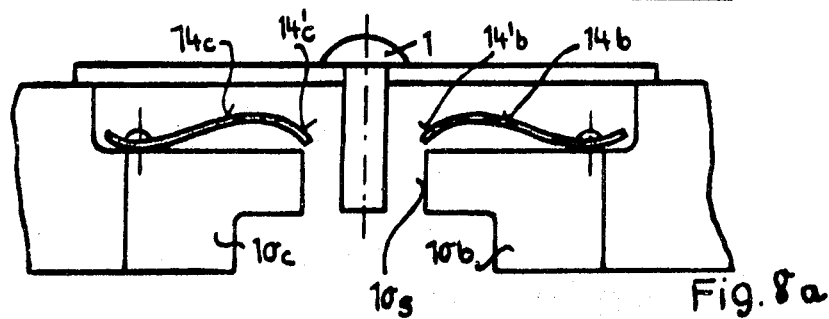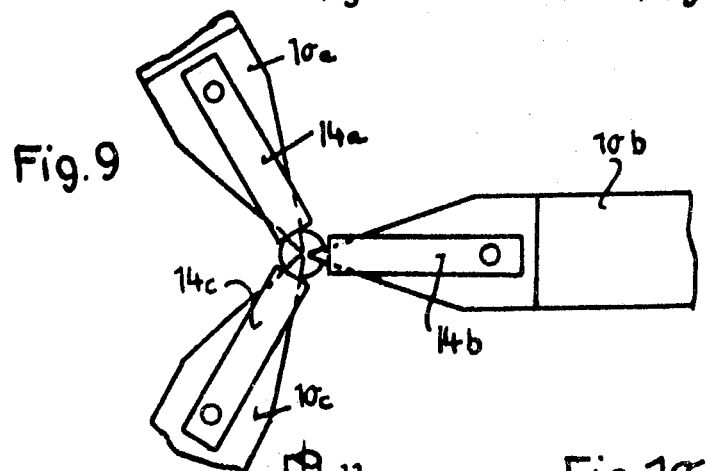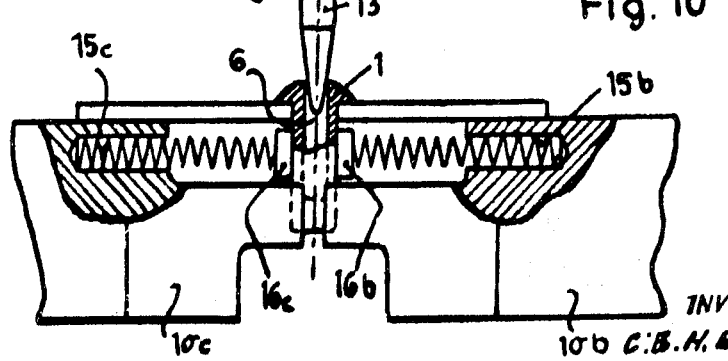

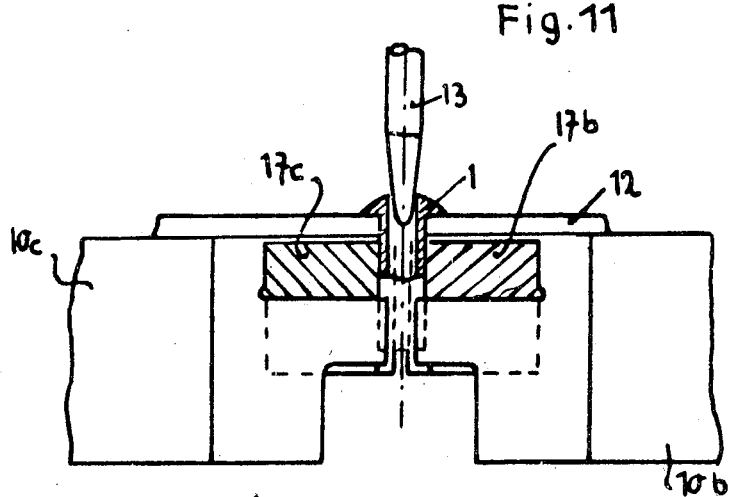
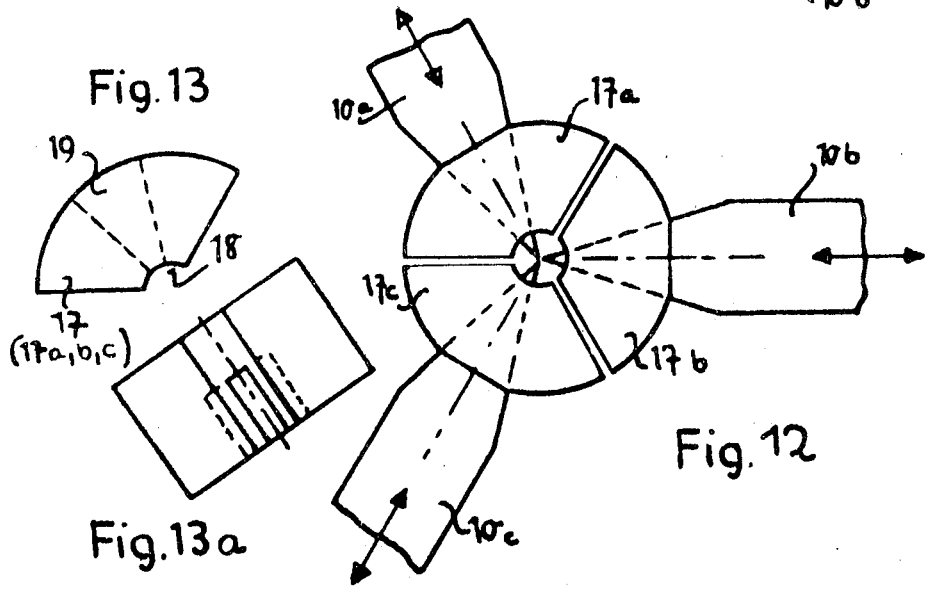

METHOD FOR MAKING BLIND RIVETS

BACKGROUND OF THE INVENTION

Blind rivets are usually provided at their lower area with transverse slots by sawing or milling, i.e., by machine cutting, whereby from the top, namely through the rivet head, a blind end hole is placed within the blind rivet, its bottom being located somewhat below the upper range of the slot. Usually, such blind rivets possess four symmetrically distributed slots, so that lugs are created, one lug between each pair of slots, and the lugs are raised and spread by a pin driven into the blind end hole after the rivet has been introduced into the workpiece. By means of this operation, all lugs of the blind rivet are moved away from the shank of the rivet laterally and spread, thereby supporting the rivet within the workpiece which can consist, for example, of two superposed plates.

Heretofore, such slots have been manufactured only by machine cutting operations and each individual blind rivet required two work processes for the production of four slots since one work process will produce two diametrically extending slots in case of such blind rivets. This method is costly, and the resulting high price for blind rivets often prevents in many instances the use of such rivets. It is therefore the primary aim of the invention to simplify and reduce in number the operations for the manufacture of the slots, and it proposes the creation of such slots within the lower rivet area by a noncutting method, the preferred and unexpected method being the use of chisel-type tools which split, and separate into lugs, the appropriate parts of the rivet shank. Preferably, these tools are operated synchronously and radially relative to the rivet. In this manner there is saved at least one operating cycle; furthermore, the operation forming the slots is substantially quicker in comparison with the old method. It becomes now also possible to provide three slots only, three lugs being fully sufficient for blind rivets of smaller diameters.

If the slots are created by chiseling, or in a similar manner, a phenomenon arises which needs to be taken into consideration when the invention is being put to practical use. Alongside the penetrating chisels, that is next to the slots, there will occur a contour or edge beading which will increase the effective diameter of the blind rivets within the region of the slots. The invention makes allowance for the requirement to have rivets so prepared inserted into workpiece bores designed for standard diameters by reducing the perimeter of the rivet shank, within the region to be provided with lugs by chisel separation, in an appropriate manner, for example by cylindrical or conical reduction. It is also possible, and often necessary, to prepare the blind rivet after creation of the slots in such simple manner that the lugs are bent inside, back into place, so that the maximum diameter of the rivet within the region of the slots will not exceed the rivet diameter of the other shank region.

It will be feasible to keep the rivet material within the region to be provided with slots solid because it is impossible to produce chiseling tools that are so effective and stable, precise in their course of motion, and adjustment that the chisel edges at the point of deepest penetration will almost touch at the central rivet axis; the thin, skinlike connection between the lugs, which will remain within the region of the central rivet axis, does not affect adversely the function of the blind rivet because the forces exerted by the drive pin will readily tear this skin when spreading the lugs apart. The alternate solution is the arrangement within the lower rivet region, i.e., the area to be provided with lugs or slots respectively, of a counter bore, opposite and coaxially to the above-mentioned blind end bore, such counter bore preferably also being made in the form of a blind end bore, so that the chiseling tool edges need not be brought to the central rivet axis. The production of splined pins, notched nails, and the like as well as blind rivets has been well known in the art for decades. Despite this, there has apparently been no recognition that properly formed blind rivets could be made by a noncutting operation. Finally, when this inventive idea did occur, there still existed a prejudice because it was believed that slots could not be formed uniformly due to the beadings occurring alongside the edges. Notwithstanding this, blind rivets according to the invention have been made and tested successfully, overcoming the preconceived ideas which existed heretofore.

It should be noted that the notching of pins and the separation into lugs in case of blind rivets by means of chiseling tools are two processes which differ in principle as well as in specific features. Thus, in case of the notching process it is desired primarily to provide the pin with peripheral beadings next to the notch at a certain, rather shallow penetration in order to guarantee a tight fit of the notched pin. In contrast thereto, this invention proposes the manufacture of blind rivets, i.e., the manufacture of slots without cutting operation within a certain region of the rivet, whereby the beadings which occur in connection therewith are undesirable and require countermeasures. In other words, in the former case, there is involved the creation of grooves or notches of certain, limited depth together with desired beadings; whereas, the latter case there is involved the separation of a solid or tubular cylindrical rivet part so that slots, extending from the outside to the inner side, are generated, thereby creating lugs which can be spread apart.

In case of the manufacture of splined pins, the notching and beading can be accomplished not only by means of notching chisels but also by means of notching wheels. It is feasible, and it is specifically claimed as part of the invention to use appropriately designed edged cylinders or wheels in place of chisel-type tools.

The invention applies, for example, to a blind rivet with a round head. The rivet has a bore which goes down partially from the head and is split at the shank end, forming individual segments or lugs, to be bent by a spreading pin which is forced in, thereby connecting plates, pipes and other components with each other. The shank can be separated into two, three, or more segments. The novel feature is the separation into several segments or lugs by chisel-type or edge-cutting tools, in place of the known milling method. In other words, such tools will penetrate the shank, separating it into several segments or lugs. This method is definitely more economical than the milling of slots because a substantially greater number of units can be processed within a given unit of time. Furthermore, no shavings are created which could adhere, in an undesirable manner, to the rivet, e.g., to the rivet slots.

The type of the connecting element, its function and method of manufacture will be explained below on the basis of the enclosed drawings in which:

FIG. 1 is a view of an installed rivet of the invention;

FIG. 2 is a view of a blind rivet according to one embodiment of the invention;

FIG. 3 is a view of the right-hand portion of the rivet of FIG. 2 illustrating its shape after completion of the cleavage operation;

FIG. 4 is a view of a rivet according to an alternative embodiment of the invention;

FIG. 5 is a side view of a typical chisel-type tool used in performing the cleavage operation;

FIG. 5A is a cross-sectional view of the tool of FIG. 5 taken along the section line 5A—5A of FIG. 5;

FIG. 5B is a cross-sectional view taken along the section line 5B—5B of FIG. 5;

FIG. 6 is an end sectional view showing the plurality-chisel-type tools used in the formation of the cleavage in the blind end of the rivet of FIG. 2;

FIG. 7 is an end sectional view illustrating the method of forming the cleavage in the blind end of the rivet of FIG. 4;

FIGS. 8 and 8A illustrate the method of holding the rivets in order to perform the forming operation of the invention;

FIG. 9 is a top view of the device of FIGS. 8 and 8A;

FIG. 10 is a side view of an alternative device used for holding the rivets and for forming therein the cleavage at the blind end;

FIGS. 11, 12 and 13 illustrate apparatus for returning the outward-sprung spreaders to a position corresponding to the original shank diameter.

Figure 14:
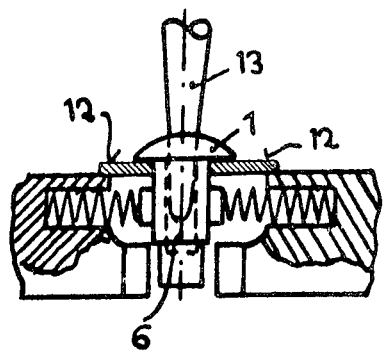
FIGS. 14 and 15 illustrate diagrammatic apparatus for automatically performing the separate, centering and shape restoration of the rivets.

FIG. 1 illustrates a general example of a round-headed blind rivet. The blind rivet 1 is provided at the lower end of its shank with lugs or spreaders 2 which are forced apart by a spreading pin 3. It becomes thereby possible to connect objects, provided with properly bored holes, with each other solidly, for example the two plates 4 and 5.

FIG. 2 depicts such rivet-shaped element, provided with a partial bore or blind end bore 6, a shank 7, whose diameter is reduced within the region of the slots, a small counter bore 8 which, preferably, ends a slight distance from the bottom of bore 6, and one or more slots 9, created by cleavage, and between these slots the lugs 2. The cleavage represents the essence of the invention, as explained above.

FIG. 6 gives a plan view of a sectional cut through the rivet shank 7 with tools 10 in operation. In this figure three tools are shown, generating three cleavages, and consequently three spreaders or lugs 2. The small, central bore 8 is provided so that the separating tools need not penetrate up to the center.

FIG. 4 shows the species of a rivet without a bore 8 so that the tools 10 must penetrate up to the center of the shank, as illustrated by FIG. 7. This feature can be carried out readily in case of a proper and accurate tool design. However, the separation can be accomplished with less difficulty if the small bore 8 is provided so that tools 10 need not penetrate up to the center point. In the case of FIG. 4 the reduction in shank diameter 11 is tapered, and practical tests have shown that a conical reduction will serve the purpose. It is the purpose of the reduction in diameter 7 or 11 to compensate for the beads created by the tools 10 when penetrating the shank. Obviously, the diameter of the shank must not exceed at any one point the specific normal size. The normal size in this case will be the wider upper shank part, and any beads which might be created must not protrude over the upper shank part because otherwise the shank could not be fitted into a properly dimensioned bore 4 (see FIG. 1). In the drawing, three spreaders or lugs are shown; however, obviously, it is also possible to create two, four or more such lugs.

In FIG. 3 there is shown additionally the right side, specifically the lug region of the rivet shank, to illustrate its shape after completion of the cleavage operation. When the tools 10 have completed fully their penetration into the shank, which is done without removal of metal as stated above, the lugs so created will rebound somewhat, or are spread apart slightly by the mass of the penetrating tools. This motion is a natural physical reaction but is a phenomenon that is disadvantageous for the insertion of the shank into a bore (for example 4a, FIG. 1). However, the specification has shown now only the novel process for the separation of a shank in detail and individual steps. It should be mentioned at this point that it will be very advantageous to round off the slot 9 within its upper area 9a because this step will avoid any upward ripping of slot 9 when the lugs 2 are being spread apart. For this purpose it will be expedient, as shown in FIG. 5, to provide the tool 10 (10a, 10b, 10c) with a curvature within its upper area 10' in such manner that the area 10' and the top edge 10'', when viewed in direction shown by arrow P, are rounded off, preferably spherically (10'). This point is illustrated by the sectional views in FIGS. 5a and 5b.

As shown by FIG. 5, the cutting edge can be designed vertically, i.e., parallel to the rivet axis (10s) or transversely, i.e., at an acute angle to the rivet axis (10's); the cutting edge can also be given a curved shape, but only in case of the species shown by FIG. 6 which is provided with a bore 8. If the shank part is kept solid (FIG. 7), it is necessary to employ a vertical cutting edge (10s), in other words, an edge running parallel to the center axis of the rivet.

Several important problems will arise in connection with the manufacture of this novel element and the method of its manufacture, to be solved by a novel device. In case of a machine which is to perform these operations automatically, it becomes necessary first to place the parts, for example a rivet 1, in a specific position so that they will be located in a precise manner concentrically within the cutting tools. Such machines and their drives will not be discussed in detail because this equipment is known. The parts 1 arrive, from an automatic feeding device, at a guide track, at which they slide suspended at their heads and with their shank pointing vertically downward.

FIG. 8 shows, in simplified form, a rivet 1 hanging at the guide track. A cam-operated swab 13 engages the bore 6 of the rivet, pulling it into a predetermined position. Obviously, this swab needs to carry out a vertical as well as a lateral movement in order to engage the bore of the rivet and to move it laterally along the track. The control elements required for this operation are known objects so that there is no need to discuss these parts in detail.

It is important in connection with the chiseling or cutting operation that the rivet shank is centered precisely within the separating tools since an unsymmetrical splitting into spreaders or lugs of nonuniform sizes would impair greatly the function of the element. For this reason each tool is provided, as shown by FIGS. 8 and 9, with a spring 14 (14a, b, c) which is curved in such manner that it leads slightly the point of the cutting tool 10, prior to its impact onto the rivet shank. FIG. 8a illustrates this "lead." The spring 14 is arranged under no-load in such manner that its points (14'b, 14'c) lead slightly the cutting edge 10s of tool 10, in other words protrude beyond it, so that upon the concentric movement (shown by arrows in FIG. 8), the springs 14 (14b, 14c) will first touch and fix centrically the blind rivet 1. Therefore, when the tools 10 move radially toward the shank, there will first be established a contact between shank and projecting spring. The springs, when not under tension, are aligned in such manner that they will force the shank first precisely into the center of the tool system. The immediately following edges of the tools 10 will then engage the perimeter of the shank at the proper points and separate it into two, three, four or more spreaders or lugs 2 of uniform sizes.

FIG. 10 depicts another species of the tool sets, again consisting of a certain number of cutting tools 10. These tools 10 are provided at their upper part with a bore, into which is placed a spring 15, with a disk 16 being arranged at the front end. At the beginning of the work cycle the small disks will lead the edges of the tool slightly, thereby centering the shank of the rivet in the same manner as shown in FIG. 7. Immediately thereafter the edges of the tools will touch the shank perimeter, enter and split the shaft in the desired, uniformly spaced manner. The rivet is moved from a position by means of the controlled swab 13, as mentioned above. The tools move in a predetermined reciprocating rhythm, in conformity with the movements of the swab. Since the drive and control components comprise elements which are known in connection with the manufacture of splined pins, no effort is made to describe these elements in detail.

It was already mentioned in connection with the description of FIGS. 2, 3 and 6 that there will occur a slight outward spreading of the lugs 2 as indicated in FIG. 3 by spreader 7a. The novel arrangement of this invention has the additional task to return the outward springing spreaders 2 into a position which corresponds to the original diameter. This is necessary in order to introduce the rivet into a bore of standard rivet diameter; this would not be possible if the diameter of the rebound spreaders exceeded the bore diameter. Therefore, a device is provided for this purpose as illustrated in FIGS. 11, 12 and 13. The tools 10 carry securely fitted squeezing segments 17. First, a specific number of lugs is produced by radial penetration of the tools into the shank of rivet 1 as described above. Later on, and preferably immediately following this operation, the slightly outwardly bent spreaders are pushed back by the curved surfaces 18 of the squeezing segments 17a, 17b, 17c which will fit tightly to the shank, thereby restoring the original shank diameter. FIG. 13 shows that the squeezing segment 17 has a recess 19 which must match the shape of tool 10 to allow the movements by tools 10 (10a, 10b, 10c) relative to slot generation. It goes without saying that control elements of known design need to be present in order to accomplish the proper movements of the controlled swab 13, for example synchronously.

Figure 15:
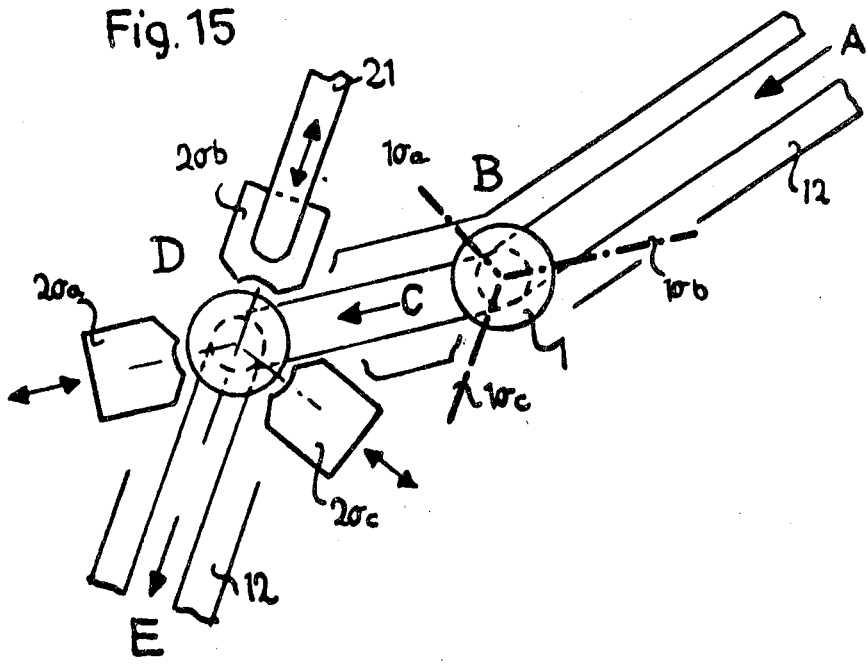

The method of carrying out separation without metal removal, centering and shape restoration has been explained above in detail. In further development, the invention proposes that these operations are performed by one machine, and specifically in operations following each other immediately, an arrangement which is illustrated in FIGS. 14 and 15. The fully automatic cycle is as follows: The unprocessed rivets arrive, coming in direction A from a feeding device, at a guide track. There, the rivets are pulled into position B with the aid of a swab 13 which is controlled automatically and is able to perform a lateral as well as a vertical movement. At B there takes place, by means of the radial movement of tools 10, carrying also the spring components, the centering of the shank and the cleavage as shown by FIG. 14. When the tools have separated again, swab 13 will act again by engaging bore 6 and moving the rivet in direction C to position D. While the next rivet, coming from direction A, is pulled into B for processing, the reshaping of the rivet, previously processed at B, takes place at D by means of squeezers 20 (20a, 20b, 20c) which functionally correspond to the components 17 (see FIG. 13). As soon as the squeezers 20 move radially outward, an ejector 21 will move the fully processed rivet in direction E to a storage bin.

We wish to state again that the various sliding parts, cams and levers which are required for the operations for the purpose of generating the movements of the various actuating parts are not shown in detail because they are constructed from known elements.

Blind rivets are the primary object of this invention, but the idea of the invention is applicable also to other types of rivets, for example rivets without pin 3, as shown in FIG. 1, where the spreading is accomplished by a tool from below; obviously, in this case head 1 must be held in place temporarily by a support. In this case, lugs 2 can be spread by a punch or other, functionally equivalent tool.

Figure 16:
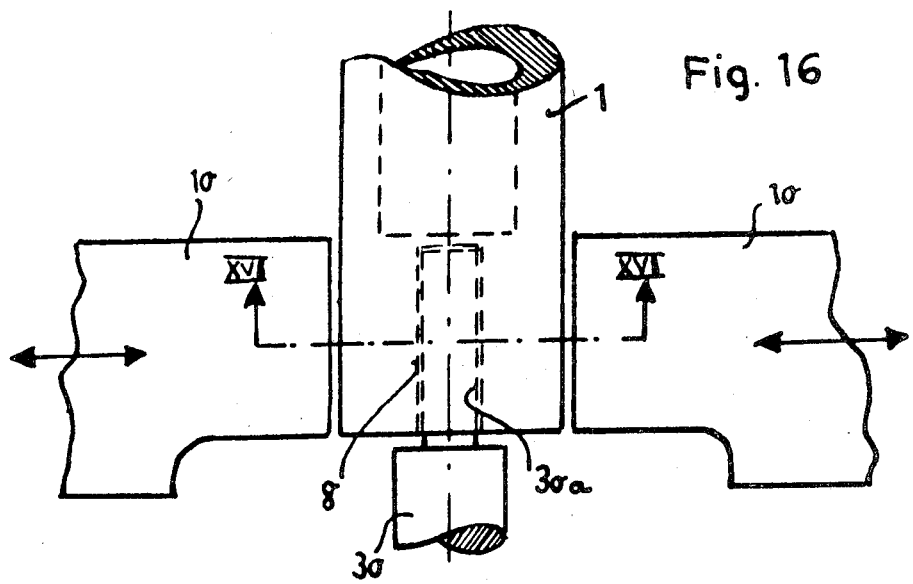
Figure 17:
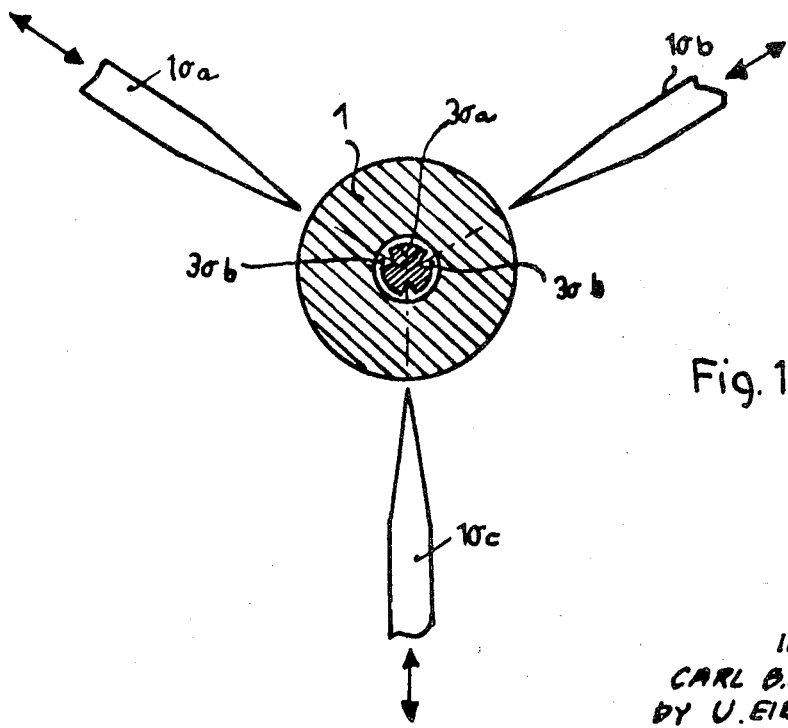

A special case is the centering of a rivet 1 as shown by FIGS. 16 and 17. The rivet must already be provided with the above-mentioned counter bore 8 so that a supporting and centering pin 30, 30a, possibly set off, can engage the bore 8 (see FIG. 16). It might be expedient to provide pin 30a with grooves 30b which are sufficiently deep so that the cutting tools 10a, 10b, 10c will enter, at their deepest penetration, the corresponding grooves 30b part of the way without touching the pin 30a proper. The illustration depicted by FIGS. 16 and 17 can be considered an amendment of FIG. 6.

Having described several embodiments of the invention as typical examples, it should be understood that various modifications and alterations can be made to the specific forms shown without departing from the spirit or scope of this invention.

What I claim is:

1. A method for the manufacture of blind rivets comprising in combination the steps of:
   a. forming a rivet blank having a shank and a head of larger cross section than said shank and with said shank having a reduced diameter at the end thereof which is opposite said head,
   b. forming an inner bore in said blank from the head end of said blank a predetermined depth toward the opposite end to receive a mandril or the like,
   c. forming a second inner bore in said blank from said opposite end toward said head end, said second bore having a lesser diameter than said first bore,
   d. moving a plurality of chisel-shaped tools which are uniformly spaced circumferentially about the rivet shank synchronously and reciprocally in a direction toward the longitudinal axis of the rivet blank to form a plurality of slots and lugs by deformation of the material,
   e. said chisel-shaped tool moving radially inwardly on each lug forming operation to a point inwardly of said second bore but stopping short of the axis of said rivet blank, whereby discrete lugs are formed in said opposite end of said shank without interference amongst the several chisel-shaped tools.

2. The method of claim 1 in which the cutting edge of each chisel-shaped tool extends at an acute angle to the center rivet axis.

3. The method of claim 2 in which said slots formed in said shank on each lug-forming step are curved at their point of deepest penetration.

4. The method of claim 1 in which during the slot-forming step the rivet blank is held in a central position equidistant from said cutting tools prior to the impact by the cutting edges of the tools.

* * * * *